March 11, 1969     C. L. RICHARDS ET AL     3,432,799
ELECTRICAL CONNECTORS FOR RIBBON CONDUCTORS OF CABLE TAPE
Filed Oct. 25, 1966     Sheet 1 of 5

INVENTORS:

CLAUDE LANGDON RICHARDS
JOHN ANTHONY CARTWRIGHT
GRAHAM PEARCE

BY Kurt Kelman
AGENT

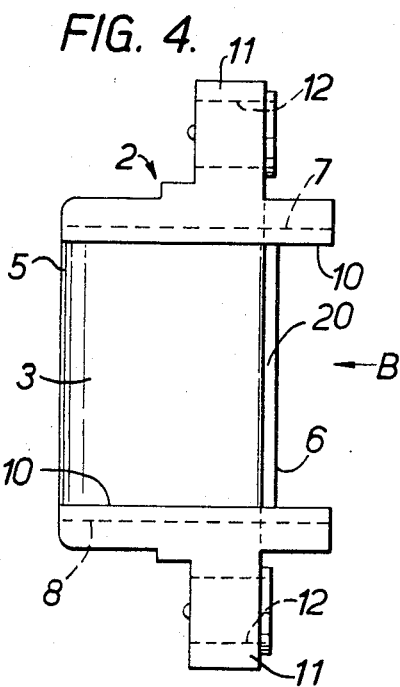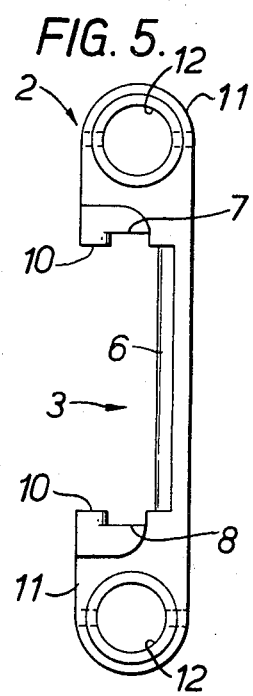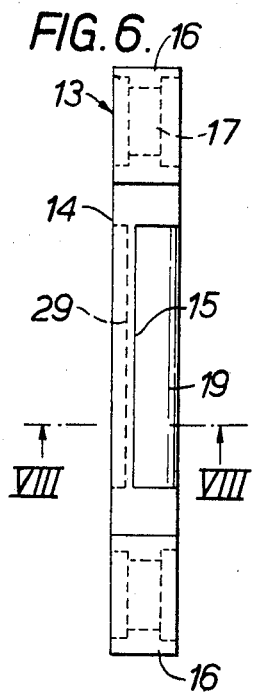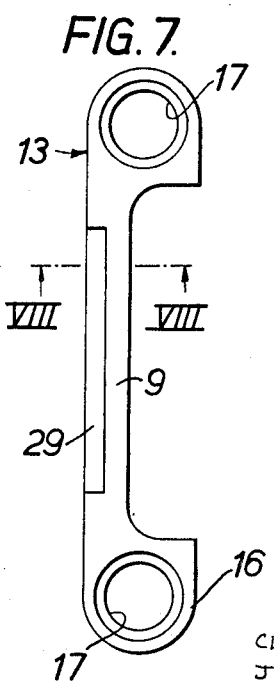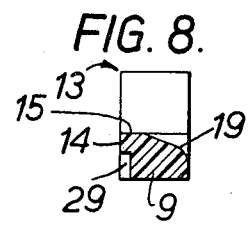

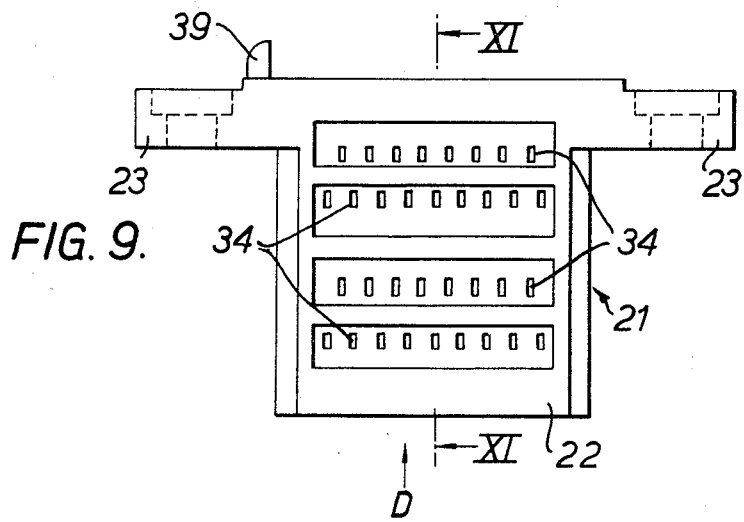
FIG. 9.
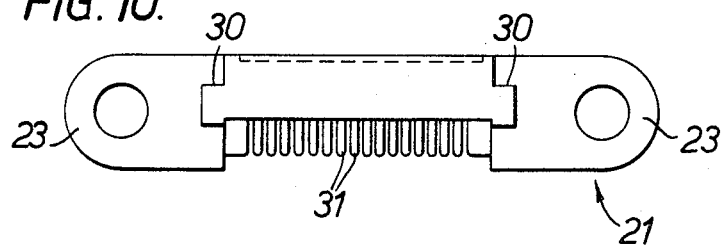
FIG. 10.
FIG. 11.
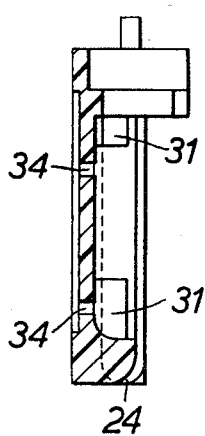
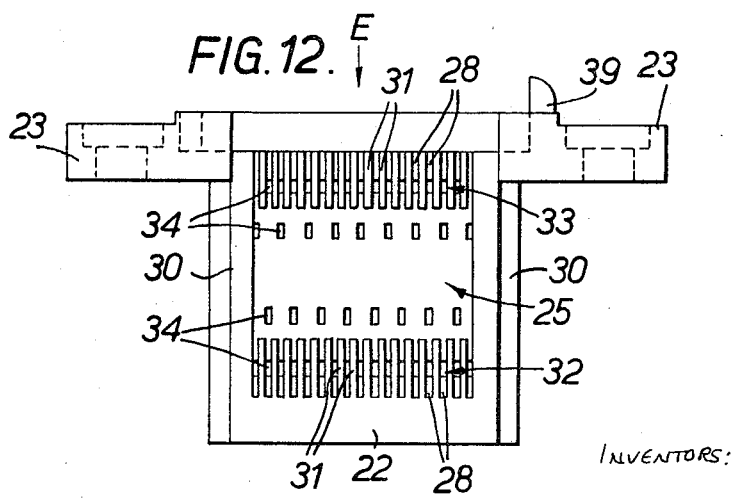
FIG. 12.
INVENTORS:
CLAUDE LANGDON RICHARDS
JOHN ANTHONY CARTWRIGHT
GRAHAM PEARCE
BY Kurt Kelman
AGENT

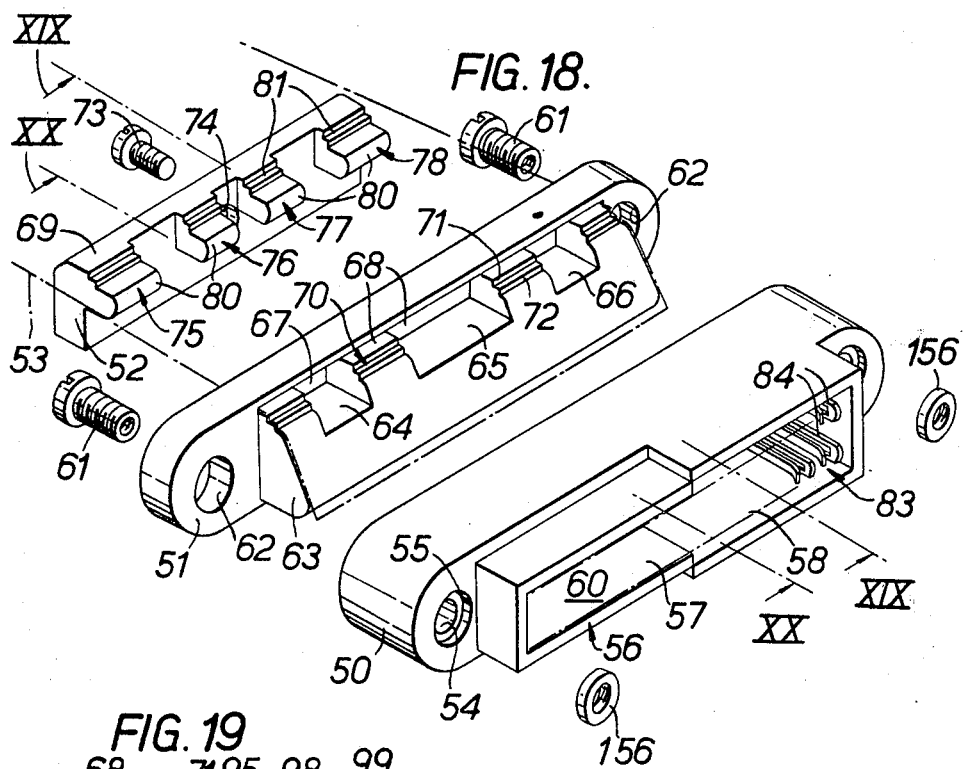
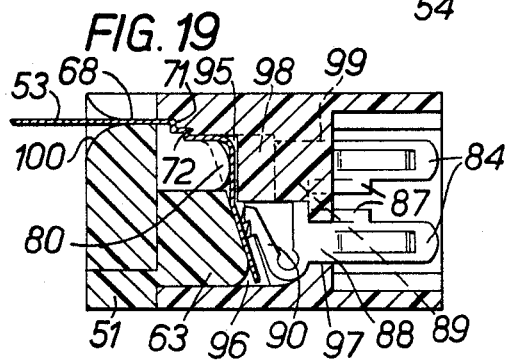
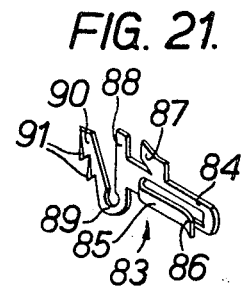
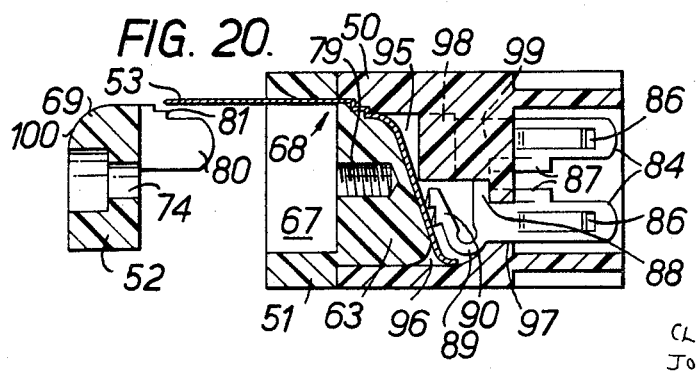

United States Patent Office 3,432,799
Patented Mar. 11, 1969

3,432,799
ELECTRICAL CONNECTORS FOR RIBBON
CONDUCTORS OF CABLE TAPE
Claude L. Richards, Pattishall, John A. Cartwright, Northampton, and Graham Pearce, Rugby, England, assignors to Painton & Company Limited, Kingsthrope, England, a British company
Filed Oct. 25, 1966, Ser. No. 589,279
Claims priority, application Great Britain, Oct. 27, 1965, 45,533/65
U.S. Cl. 339—99
Int. Cl. H01r 11/20, 13/50; H05k 1/00
7 Claims

ABSTRACT OF THE DISCLOSURE

A connector for ribbon conductors of a cable tape, the connector having a body consisting of separably assembled components. The body forms a tape receiving recess and is provided with means to grip the tape against longitudinal movement. Contact clips are anchored in the body, each clip having a toothed end portion resiliently biased toward the tape. The body components are assembled with a relative longitudinal displacement of the toothed end portions and the tape, causing the toothed end portions to plough through insulation of the tape and to longitudinally scrape the ribbon conductors.

---

This invention relates to electrical connectors and, more specifically, is concerned with a connector for making connections to individual conductors of a flat tapelike cable hereinafter referred to as a cable tape.

The cable tape is a new development and consists of several spaced copper foil ribbons arranged parallel to one another and lying in a common plane. The foils are attached to a flexible insulating backing, conveniently plastics material, and are covered with a similar insulating layer which is bonded to the foils and to the backing to provide a cable which resembles a tape. The insulating material is usually transparent so that the individual conductors formed by the foil ribbons are visible in the cable. Such a cable tape may have a total thickness of .01 inch and may contain upwards of 30 ribbons of copper foil each .05 inch wide, and .002 inch thick spaced from one another by .05 inch. Such cable tapes are available in long lengths which can be cut into shorter lengths if required.

Special connectors are required to enable electrical circuits to be rapidly connected to respective conductors of the cable. Hitherto connectors for this purpose have been provided with pins or teeth individually associated with the copper foil ribbons and which pierce the plastics insulation and embed themselves in the copper foil of the ribbons. These pins are usually held in a common moulding and have additional parts to enable them to be mated with complementary contacts in another moulding. Although this type of connector enabled a connection to the conductors of the cable to be made rapidly, the reliability of the electrical connection so made is not altogether satisfactory as it gives only a small area of effective electrical contact between a conductor and a pin or tooth in contact therewith. This introduces an unwanted contact resistance into the electrical circuit as well as being a possible source of insulation overheating when the conductor is passing current.

A further disadvantage is that in cable tapes at present on the market the thickness of the foil ribbons and the thickness of the cable insulation are not yet standardised for a given size of cable and these thicknesses tend to vary slightly from one manufacturer to another. Thus a connector usable with one manufacturer's cable may be unusable with another manufacturer's cable as the pins either fail to reach the foil ribbon or pass wholly through it.

This disadvantage has led to one form of connector being devised where the teeth are deliberately blunted so that a large area of contact between the teeth and the copper foil is obtained and the teeth, although sharp enough to penetrate the insulation, are not sharp enough to penetrate the ribbon, and merely bear against it. However, there is a danger that with this form of connector some of the insulating material is sometimes trapped between the blunted points of the teeth and the foil and prevents good electrical contact being made therebetween.

The construction of a connector capable of accommodating cables of different thickness and reliably making electrical connections to the ribbons has posed a problem to connector manufactureres as not only does the thickness of the insulation vary but also the copper foil thickness varies in accordance with its current carrying capacity.

An object of this invention is the provision of an improved cable tape connector.

In accordance with the present invention there is provided a connector for making electrical connections individually to ribbon conductors of a cable tape, comprising: separable parts having faces defining opposite sides of a space in which lies a section of the tape in the assembled connector; locating surfaces for preventing sideways movement of the tape section in the space; conductive projections extending transversely towards one of the faces from the other face and corresponding in number and spacing to the foil ribbons of the tape section, each projection being provided with at least one tooth having its tip directed towards one of the faces and having its flanks aligned with one of the ribbons; springing associated with the projections and urging them resiliently towards said one face so that the tape section is pinched between the teeth tips and said one face; a clamp portion for holding the tape section against endwise movement in the space in one longitudinal direction; and means for producing relative displacement between the teeth and the tape-section in the direction of the ribbons during assembly of the connector to plough the teeth through the surface insulation of the tape section and allow the tips of the teeth to press into the foil ribbons beneath.

In the arrangement of connector of the invention the shape of the teeth are such that during assembly of the connector the teeth of the projections are resiliently pressed by the spring into scraping relation with the surface insulation of the tape at the positions of the conductive foil ribbons so that the cutting surfaces of the teeth plough through the surface insulation during movement of the two parts together and make good electrical contact with the underlying ribbons against which the teeth are resiliently continuously held by the springing. The springing is preferably individually associated with the projections although, if preferred, a form of springing may be used which acts on all of the projections.

In the preferred construction of connector each projection is formed integrally with its connecting terminal, two or more teeth and a return bend providing the necessary springing, from a suitably shaped flat strip of metal. The shaping is preferably carried out by a stamping operation from a flat metal sheet The springing or spring loading of the projections alone compensates for variations in the thickness of the surface insulation on the tape so that the same connector can be used with different thicknesses of cable tape. The springing or spring loading is such as to enable the teeth to plough easily through the soft surface insulation of the cable but is generally insufficient to cause them to penetrate the conductive ribbons. Ideally the teeth merely scrape along the surface of the ribbons and their tips partially embed themselves in the metal of the ribbons to make good electrical contact therewith. The springing or spring loading ensures that good electrical contact is maintained between the teeth and the ribbons at all times.

Preferably more than one tooth is provided on each projection and the teeth of each projection may be arranged in line or offset with respect to one another. The teeth may be shaped as saw-teeth provided with cutting edges directed towards the path of movement of the teeth when the two parts of the connectors are moved together. They may also be provided with sole portions following respective cutting edges and for bearing against the surface of the ribbon exposed by the cut.

A connector in accordance with the invention may be designed as a junction connector between two cable tapes, as a T-junction in a length of cable tape, or simply as a termination to a single cable strip. Alternatively it may be incorporated into a plug or socket connector which, for example, can be subsequently fitted into a printed circuit edge connector or some such similar socket connector.

Suitably the electrical connections to the connector are each formed by two springy strip metal parts which slidably engage one another to make an electrical connection therebetween, one of the metal parts comprising an elongated metal strip having a flute pressed out of its central portion so that the strip in cross-section resembles a U provided with outwardly directed flanges extending from the extremities of the U, and the other part being of C-shaped cross-section with the end portions of the C curving away from the back of the C to provide two arcuate bearing surfaces, the parts being mated with one another by sliding said other part over said one part so that the hollow of the flute is covered by the back of the C and the convex bearing surfaces provided on the end portions of the C bear resiliently against the convex surfaces of the flute. An electrical connection so made is particularly well suited for attaching leads to tags integral with the projections.

The invention will now be described in more detail, by way of examples, with reference to the accompanying drawings, in which:

FIGURE 4 is a plan view of the base part of the connector;

FIGURE 5 is an end view of the base part viewed in the direction of the arrow B in FIGURE 4;

FIGURE 6 is a plan view of a ramp piece part of the connector;

FIGURE 7 is an end view of the ramp piece viewed in the direction of the arrow C in FIGURE 6;

FIGURE 8 is a section through FIGURE 7 taken on the line indicated by the arrows VIII—VIII in that figure;

FIGURE 9 is a plan view of a slider block part of the connector;

FIGURE 10 is an end view of the slider block viewed in the direction of the arrow D in FIGURE 9;

FIGURE 11 is a section through FIGURE 9 taken on the line and in the direction indicated by the arrows XI—XI;

FIGURE 12 shows the underside of the slider block;

FIGURE 18 is an exploded perspective view of another arrangement of connector;

FIGURE 19 is a vertical section through the assembled connector of FIGURE 18 and taken on the line indicated by the arrows XIX in FIGURE 18;

FIGURE 20 shows a stage in the assembly of the connector and is a vertical section taken of the line indicated by the arrows XX in FIGURE 18; and, FIGURE 21 is a perspective view of one of two constructions of contact clip used in the connector.

Figure 1:
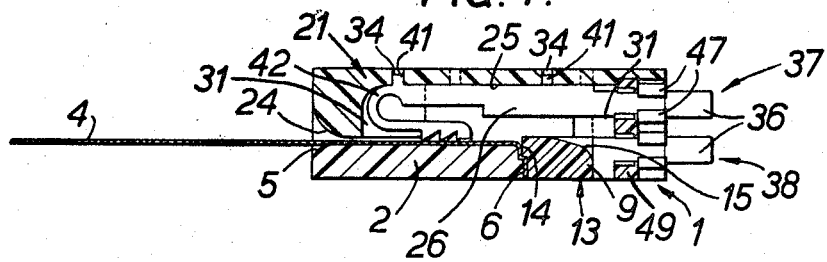
FIGURE 1 shows, in section, a terminal connector at one end of a cable tape.

Referring to FIGURES 1, 2, 4 and 5 a connector 1 is provided with a base 2 having formed in it a wide shallow channel 3 of slightly greater width than the width of the cable tape 4 with which the connector is to be used. The floor of the channel is rounded at one end 5, hereinafter referred to as the front end, whereas its rear end ends abruptly in a stepped face 6 extending perpendicularly to the floor of the channel. The side walls 7, 8 of the channel are provided with inwardly directed flanges 10 which overlie and are spaced from the floor of the channel. Each side wall 7, 8 is provided intermediate its ends with an outwardly projecting lug 11 penetrated by a threaded bore 12 axially parallel with the side wall.

Figure 2:
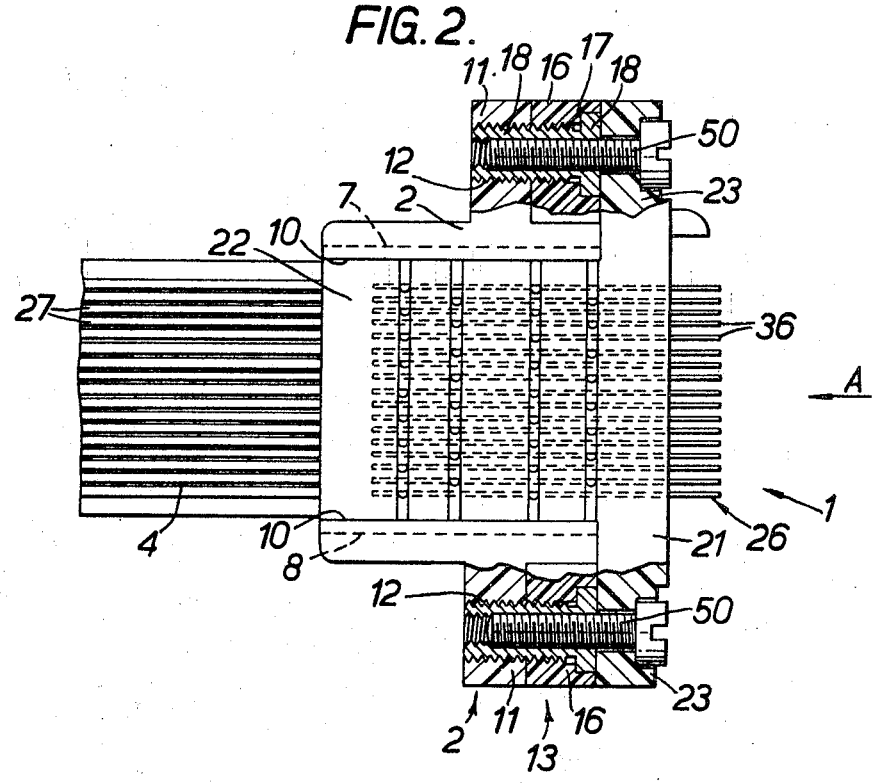
FIGURE 2 is a plan view of FIGURE 1 with parts broken away to reveal internal detail.

Held against the rear end of the base is a ramp piece 13 shown in detail in FIGURES 6, 7 and 8. The ramp piece is formed with a cross-member 9 having a flat stepped front surface 14 which locates against the rear face 6 formed on the base 2. The upper surface 15 of the cross-member slopes downwardly towards the rear to provide a ramp surface 19. At opposite ends of the cross-member 9 the ramp piece 13 continues beneath the flanged side walls 7, 8 of the base 2 as shown in FIGURE 2 and terminates in a lug 16 shaped to fit flush against the rear face of the adjacent lug 11 on the base. Both lugs 16 of the ramp piece 13 are provided with countersunk bores 17 which register with the bores 12 in the base lugs 11. An externally and internally threaded hollow sleeve 18 is screwed through the aligned bores 12, 17 of each pair of lugs 11, 16 and holds the ramp piece 13 firmly against the flat rear end 6 of the base 2. Beneath each of the side walls the rear surface 6 of the base 2 is stepped to provide a shelf 20, shown in FIGURES 4 and 5, and mates with a complementary stepped portion 29 of the ramp piece shown in FIGURE 7 to assist correct location of the ramp piece against the rear surface of the base.

The connector is provided with a slider block 21, shown in FIGURES 9 to 13, of generally T-shape and moulded of plastics material. The stem 22 of the T is of wide flattened form and is shaped to cover the floor of the base 2, being adapted to be slid into position from the rear end.

The marginal edges of the stem 22 of the T are stepped at 30 to mate with the inwardly turned flanges 10 on the side walls of the base 2 so that when the slider block 21 is slid over the ramp piece 13 and base 2 its top surface is co-extensive with the tops of the flanges 11 and its under-surface lies close to the floor of the base 3 as shown in FIGURE 1. The two side parts of the slider forming the head of the T provide lugs 23 which are similar in shape to the lugs 11, 16 on the ramp piece and base, and are arranged to abut the rear surfaces of the lugs 16 on the ramp piece when the slider block 21 is slid into its operating position in the channel. The front lower end portion of the stem of the slider block is bevelled upwardly at 24 to provide, with the rounded portion 5 at the front of the base, a mouth which is free of sharp corners and through which the tape cable 4 enters the connector 1. The rear face of block 21 is provided at one side with a locating peg 39 as shown in FIGURE 9 and for polarising the connector.

Figure 3:
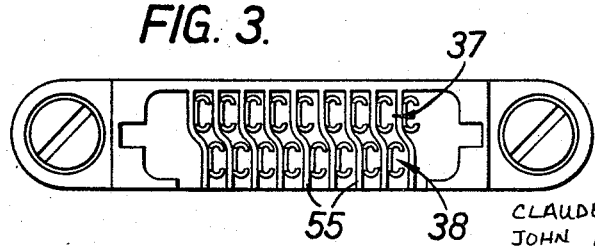
FIGURE 3 is an end view of the connector taken in the direction of the arrow A in FIGURE 2.
Figure 13:
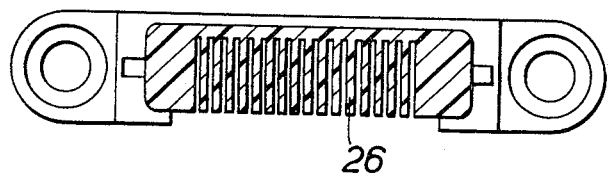
FIGURE 13 is an end view of the slider block viewed in the direction of the arrow E.

The T-shaped slider block 21 is provided in the undersurface 25 of the stem 22 with a number of parallel contact clips 26 which terminate short of the bevelled front end of the block and extend through the rear ends as shown in FIGURE 1. The clips 26 correspond in number and spacing to the medial lines of conductive foil ribbons 27 in the cable tape 4 to which the connector 1 is to be attached. Each clip 26 is located in a slot 28 shown in FIGURE 12 and formed between barrier walls 31 arranged in two parallel sets 32, 33 adjacent the front and rear of the underside of the slider block respectively. Each clip 26 is provided with an electrical contact strip 36 which projects from the rear end of the slot 31 of set 33 to provide a terminal. Alternate terminals form a line 37 adjacent the top of the connector as shown in FIGURE 3 while the remaining terminals form a line 38 adjacent the bottom of the connector. The terminals of each line are spaced by parallel sinuous ribs 55 shown in FIGURE 3.

Figure 14:
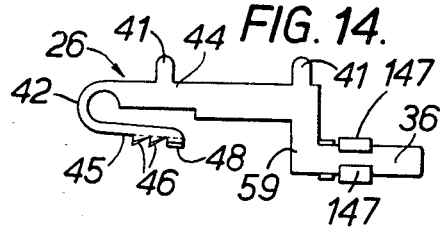
FIGURE 14 shows in elevation a contact clip used in the connector.
Figure 15:
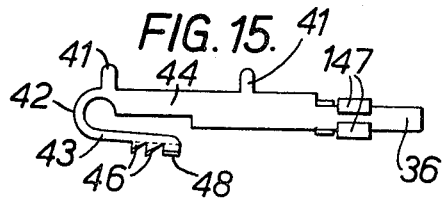
FIGURE 15 shows in elevation a second form of contact clip which alternates with the clip shown in FIGURE 14.

Each contact clip 26 is stamped from a flat contact strip made of phosphor bronze in either of the shapes shown in FIGURES 14 and 15. The strip is stamped in a generally horizontal J-shape, a free end-portion 38 of the stem of the J being either cranked as shown in FIGURE 14 at 59 or straight as shown in FIGURE 15, and projecting from the rear end of the slit to provide the terminal 36. The remainder of the stem of the J provides a back support for the contact clip and rests against the underside of the intermediate portion of the slider block between the two sets of barrier walls 31 as shown in FIGURE 1. Endwise location of the contact clip 26 is effected by two small upright tabs 41 which respectively lock into two spaced slits 34 extending upwardly through the underside of the slider block in registration with the slots 28 formed between the barrier walls 31. The slits 34 associated with neighbouring contact clips 26 lie in four staggered lines as shown in FIGURE 12.

Returning to FIGURES 14 and 15, the return bend 42 of the J is thinner than the remainder of the clip and is disposed at the front end of the slot as shown in FIGURE 1. The smaller limb 43 of the J extends parallel and beneath a portion 44 of the stem of the J of slightly reduced width, and, its under edge is formed with two inclined teeth 46 each of saw-toothed shape and having its sloping edge disposed at the rear and its cutting or upright edge disposed at the front. The two teeth present downwardly directed sharp tips 49 formed by inclining the metal of the teeth at a slight angle to the plane of the strip as clearly shown in FIGURE 16 so that the bottom edge of each tooth is formed by a corner edge of the strip. A rectangular sole portion 48 is provided rearwardly of the teeth and presents a flat undersurface in alignment with the tips of the teeth for bearing on the foil ribbon 27 after the insulation above it has been cut away by the advancing teeth 46.

Figure 17:
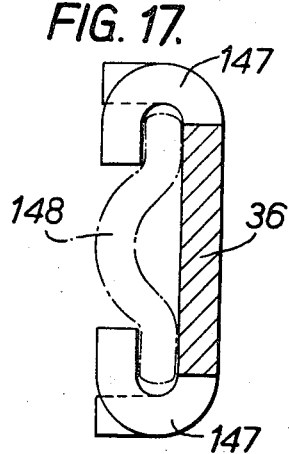
FIGURE 17 is an enlarged section through a part of a clip terminal containing a connecting spill.

The terminals 36 are each formed with a pair of side arms 147 bent over to provide the root portion of the terminal with a C-shaped cross section as shown in FIGURE 17 for the reception of a fluted spill connector 148 as shown in dotted outline and to which an electrical lead is connected. The spill connector, like the clip, is made of stiff flexibly resilient metal so that it is firmly gripped by the arms 147 when pushed into position.

It will be appreciated that the parts for connecting a lead to the terminal may be interchanged in function if preferred, thus the spill may be given the C-shaped section and the terminal 36 provided with the flute.

The connector is assembled as follows:

The tape cable 4 to which the connector 1 is to be attached is led from the front end of the base 2 rearwardly over the floor of the channel 3 and downwardly behind the rear face 6 of the base. The ramp piece 13 is at this time spaced rearwardly of the base 2 so that the end of the tape cable can be threaded downwardly between the opposed stepped faces of the cross member and the base. The hollow sleeves 18 extending through the lugs 11, 16 of the ramp piece 13 and the base 2 are then screwed up so that the end portion of the cable tape is clamped between the opposed complementary stepped faces of the ramp piece 13 and base 2 and thus firmly held in position.

The T-shaped slider block 21 in which the contact clips 26 have already been mounted is then slid into position from the rear end of the ramp piece and base. During initial forward sliding movement of the stem of the T, the forwardly inclined teeth 46 of the contact clips 26 projecting from the underside of the slider block 21 slide upwardly over the ramp surface 15, such sliding movement being permitted by the resilience of the return bends 42 of the J-shaped clips. During intermediate movement of the slider block 21 into position the teeth 41 are dragged forwardly over the surface of the section of the cable tape 4 lying on the floor of the channel 3 of the base 2 and their forward cutting edges, being pressed resiliently downwards, plough through the relatively soft surface insulation of the cable tape 4. As a result the pointed tips 47 of the teeth 46 cut through the insulation enabling the flat sole portion 48 following the teeth and embed themselves in the metal surface of the conductive ribbons of the tape cable now bared by the teeth so that good electrical contact is made therewith. The contact clips 26 are so shaped and the thickness of each return bend 42 is so selected that the resilient pressure with which the teeth 46 are pressed against the tape 4 is such that although the tips of the teeth penetrate the plastics insulation of the cable tape readily, they do not easily slice through the conductive ribbons 27 but preferably merely scrape along their surfaces and slightly embed their tips 47 in the ribbons 27.

Final movement of the slider block 21 into the base 2 is followed by locking the lugs 23 of the slider block to the base 2 by means of bolts 50 which are passed through holes in the lugs 23 of the head of the slider block 21 and are screwed into the internally threaded sleeves 18.

It will be appreciated that in the above described connector the set of teeth associated with each of the contact strips is spring-loaded against the tape cable by the return bend of the J and the force exerted by the spring loading can be finely selected by altering the thickness of the return bend during manufacture. Thus the pressure of the teeth can be so selected that there is little, if any, tendency for them to slice up the conductive ribbons of the cable tape but instead they are continuously held in resilient contact with the conductive ribbons while the connector is in use. Also, because of the resilience of the spring formed by the return bend, the electrical contacts provided by the teeth adapt themselves individually and automatically to thicker cable because the flexing of the return bend is greater for a thicker cable and therefore the force with which the teeth are driven through the insulating layer covering the conductive ribbons is increased.

The connector shown in the exploded perspective view in FIGURE 18 is differently constructed from that shown in earlier figures. It comprises a body portion 50 adapted to have clamped to one side a clamp piece 51 which is formed with a socket 67 to receive an insert 52. A cable tape 53 is shown in dotted outline to give some idea of the relative sizes of the parts of the connector.

The body portion 50 is of elongated shape and is formed at opposite ends with holes 54 which are countersunk at 55 for the reception of a circular nut 156. The rear face of the body portion 50, shown on the right hand side of FIGURE 18, is formed with a rearwardly extending flange 56 having two channel shaped halves 57 and 58 of different widths and arranged facing one another so that they frame a generally rectangular recess 60. The channel-shaped half flanges 57 and 58 are so shaped that they can be mated with corresponding half flanges formed on an identical body portion of another connector when the two connectors are mated back to back. The placing of the two connectors back to back enables the half flange 58 of one connector to slide over the half flange 57 of the other connector so that a polarised spigot and socket connection is obtained with half of each of the flanges 57 forming the spigot and the other halves 58 of the flanges forming the socket. Such an arrangement is described and claimed in our Patent No. 930,509.

The clamp piece 51 is adapted to be clamped to the front face of the body portion 50 by a pair of bolts 61 which pass through respective holes 62 in opposite ends of the clamp piece and through the holes 54 in the body portion 50. The nuts 156 can then be screwed onto the ends of the bolts 61. The rear surface of the clamp piece 51 is formed with a rearwardly projecting nosepiece 63 which is received within a cavity 95 in the body portion 50 as shown in FIGURES 19 and 20. Three slots 64, 65 and 66 are formed in the upper portion of the nosepiece 63 and they lead into a socket 67 formed in the front face of the clamp piece 51 immediately behind the nosepiece 63. The bridge of the nosepiece 63 is ridged at 70 to provide two parallel grooves 71, 72. An elongated slot 68 extends between the front and rear faces of the clamp piece 51 immediately above the nosepiece 63 and, as shown, the cable tape 53 passes through the slot 68.

The insert 52 is shaped to fit snugly in the socket 67 in the front face of the clamp piece 51 so that the top-surface 69 forms part of the undersurface of the slot 68 when the insert piece 52 is placed in the socket 67 as shown in FIGURE 19. The insert 52 is retained in the socket 67 by means of a bolt 73 which passes through a hole 74 formed in the centre of the insert 52 and which is screwed into a threaded hole 79 extending into the rear surface of the nosepiece 63 as shown in FIGURE 20. The insert 52 is provided with four rearwardly extending plug portions 75, 76, 77 and 78 which pass through the three slots 64, 65 and 66 of the nosepiece 63. When the insert piece 52 is fully inserted into the socket 67, the terminal parts 80 of the plug portions project beyond the rear face of the nosepiece and a ridged portion 81 of each of the plug portions is brought into registration with the ridged portion 70 of the nosepiece 63. The two plug portions 76 and 77 extend through the slot 65 in the nosepiece whereas the two plug portions 75 and 78 extend respectively through the slots 64 and 66 of the nosepiece.

Mounted inside the body portion 50 is a line of contact clips 83 two of which are shown in FIGURE 18. The contact clips are individually provided with terminals 84 which extend rearwardly inside the recess 60 and, as shown in FIGURES 19 and 20, the terminals 84 are arranged in two rows disposed one above the other. Alternate contact clips have their terminals 84 lying in one row whereas the remaining contact clips have their terminals 84 lying in the other row, the terminals in the two rows being staggered with respect to one another.

Figure 16:
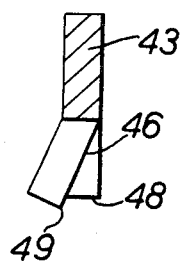
FIGURE 16 is a section through a toothed projecting portion of the contact clip of FIGURE 15.

FIGURE 21 shows one of the contact clips 83 in detail. It is made by stamping a blank out of a flat sheet of suitable metal, such as phosphur bronze, and then shaping the blank to form the contact clip. The terminal portion of the blank has a finger 85 punched out of it on one side and curled slightly away from the blank at its end 86. Above the root of the finger 85 the blank is formed, by means of a second cut, with a tab 87 which is pressed out of the opposite side of the blank to that from which the finger 85 extends. The terminal 84 extends rearwardly from an upright leg 88 which is connected by a return bend 89 to a forwardly and upwardly inclined toothed strip 90. The width of the blank at the return bend is less than the width of the leg 88 or the strip 90 and its dimensions determine the flexibility of the return bend. The front edge of the strip 90 is provided with two teeth 91 each of which is provided with a forwardly extending sharp tip formed by deflecting the teeth to one side of the plane of the blank in the same way as shown in FIGURE 16 of the embodiment already described. FIGURE 21 shows a contact clip having its terminal 84 forming one of the lower row; the contact clips of the upper row are identical except that the terminal 84 extends rearwardly from an upward projection 89 (see FIGURE 19) of the lege 88 and the tab 87 is formed on its underside.

FIGURE 20 shows how the contact clips 83 are mounted in the body portion 50. The front face of the body portion is formed with a shaped cavity 95 which receives the nosepiece 63 when the clamp piece 51 is secured to the body portion 50. The lower portion of the cavity 95 extends rearwardly beyond the front of the nosepiece 63 to provide a longitudinally extending chamber 96 containing the toothed strips 90 of the contact clips. The toothed strips 90 are spaced from one another by approximately the same spacing as the foil ribbons of the cable tape 53 and form a single line. The rear wall of the chamber 96 is formed with a row of slits 97 through which extend the terminals 84 of the lower row. Above the chamber 96 are a number of parallel spaced square webs 98 formed integrally with the body portion 50 and which define between them slots for retaining in position the upward extensions 89 of the legs 88 of those contact clips which have their terminals 84 lying in the upper row in the recess 60. Slits 99 are formed through the rear walls of the slots between the webs 98, and the terminals 84 of the upper row pass through the slits 99. Both the lower set of slits 97 and the upper set of slits 99 are each dimensioned to allow both the curled end portion 86 of the finger 85, when its curled end portion 86 is pressed back into the plane of the terminal portion, and the tab 87 to be passed rearwardly through them.

The assembly and method of using the connector will be understood from FIGURES 19 and 20.

To assemble the connector the contact clips 83 are first inserted into the body portion 50. They are inserted from the front of the body portion so that the terminals 84 pass through their respective slits 99 and 97. An appropriate tool is necessary to hold the curled end portion 86 of the finger 85 in alignment with the terminal 84 during its insertion through the slot. When the upright legs 88 are located against the rear wall of the chamber 96 the front ends of the tabs 87 clear their respective slits and spring sideways to prevent withdrawal of the contact clips forwardly from the body portion 50.

The cable tape 53 is threaded through the slot 68 in the clamp piece 51 and led downwardly over the front of the nosepiece as shown in FIGURE 20. The clamp piece 51 is then placed against the front of the body portion 50 so that the nosepiece 63 enters the cavity 95. The bolts 61 are passed through the holes 62 and 54 and are screwed into the nuts 156 so that the clamp piece 51 is drawn towards the front face of the body portion 50. A portion of the upper part of the cavity 95 is ridged in complementary manner to the ridged portion 70 of the nosepiece 63 so that as the clamp piece 51 is drawn against the body portion 50 the cable tape 63 is clamped in zig-zag fashion between the ridged portions. The cable tape is thus firmly held. As the clamp piece is drawn towards the body portion 50, the lower rear surface of the nosepiece 63 presses the end portion of the cable tape 53 located in the chamber 96 firmly against the tips of the teeth 91 of the contact clips. The contact clips are so positioned in the body portion 50 that their teeth 91 overlie the foil ribbons of the cable tape 53. The return bends 89 of the contact clips 83 allow the toothed strips 90 to flex as the clamping piece 51 is clamped in position.

The insert 52 is next placed in the socket 67 in the front face of the clamp piece 51. The plug portions 75, 76, 77 and 78 engage with their rounded rear portions 80 the front face of the cable tape 53 where it overlies the slots 64, 65 and 66. By inserting the bolt 73 through the aperture 74 and screwing it into the threaded opening 79 in the clamping piece 51, the insert 52 is drawn into the socket 67. This forces the rounded portions 80 of the nosepieces against the cable tape so that it is displaced and its lower end portion is dragged up the rear face of the nosepiece 63 as shown in FIGURE 19. This upward dragging movement of the end portion of the cable tape 53 past the teeth 91 causes the tips of the teeth to slice through the insulation covering the foil ribbons and embed themselves in the foil ribbons so that a good electrical and mechanical connection is made with them.

As is clearly shown in FIGURE 19, the upper frontal surface of the insert piece 52 is rounded at 100, and the inside upper frontal surface of the clamp piece 51 is also rounded so that there is no danger of damage to the cable tape 53 by chafing against sharp corners at the entry to the slot 68. The width of the slot 68 is only fractionally larger than the width of the cable tape 53 so that lateral movement of the tape in the slot and consequential misalignment between the foil ribbons and the teeth 91 of the contact clips 83 is prevented.

The assembled connector may be mated with an identical connector when the shape of the flange 57 ensures correct polarisation between the terminals of the two connectors. During mating of two identical connectors each of the terminals 84 of the connectors is received between a terminal 84 and the associated finger 85 of the other connector. Thus two connectors fitting together back to back present, in appearance, a generally parallelepiped shape with all surfaces flush and the terminal portions interfitting with one another.

We claim:

1. An electrical connector for ribbon conductors of a cable tape, comprising a connector body consisting of a plurality of separably assembled components, said body having a tape receiving recess defined by a tape engaging face on one of said components and an opposing face on another of said components, a set of contact clips mounted in said body in spaced parallel planes perpendicular to said tape engaging face, each of said clips including a fixed portion anchored in the body and provided with an electrical terminal, a free end portion projecting into said recess, and a reversely bent intermediate portion resiliently connecting said free end portion to said fixed portion for movement of the free end portion toward and away from said tape engaging face with a resilient bias of the free end portion toward the tape engaging face by said intermediate portion, at least one tape engaging tooth provided on said free end portion of each contact clip, means for gripping the tape between assembled components of said body to hold the tape against longitudinal movement in one direction, and tape deflecting means provided on still another component of the body, said deflecting means being projectable through said tape engaging face to deflect the tape from the plane of the latter and thereby cause longitudinal displacement of the tape relative to the teeth of said contact clips during assembly of the components, whereby during an initial stage of said displacement the teeth may plough through tape insulation overlying ribbon conductors and during a final stage of the displacement the teeth may scrape the ribbon conductors longitudinally under the resilient bias of the intermediate portions of said contact clips.

2. The connector as defined in claim 1 wherein said contact clips are mounted in said another of said components with said free end portions of the clips projecting from said opposing face into said recess, said one of said components provided with said tape engaging face being formed with openings to receive said tape deflecting means on said still another component of the body.

3. The connector as defined in claim 1 wherein said free end portion of each contact clip is substantially flat in a plane perpendicular to said tape engaging face, said tooth being formed integrally with said free end portion and being inclined laterally from said plane to provide a sharp tape engaging corner on the tooth.

4. The connector as defined in claim 1 wherein said tooth of each contact clip is a saw tooth having a perpendicular leading edge and a sloping trailing edge with respect to direction of longitudinal displacement of the tape relative to the tooth during assembly of the components.

5. The connector as defined in claim 4 wherein said free end portion of each contact clip is substantially flat in a plane perpendicular to said tape engaging face and has said tooth formed integrally therewith, said tooth being inclined laterally from said plane to provide a sharp tape engaging corner at the junction of said leading and trailing edges of the tooth.

6. An electrical connector for ribbon conductors of a cable tape, comprising a connector body consisting of a plurality of separably assembled components, said body having a tape receiving recess defined by a tape engaging face on one of said components and an opposing face on another of said components, a set of contact clips mounted in said body in spaced parallel planes perpendicular to said tape engaging face, each of said clips including a fixed portion anchored in the body and provided with an electrical terminal, a free end portion projecting into said recess, and a reversely bent intermediate portion for movement of the free end portion toward and away from said tape engaging face with a resilient bias of the free end portion toward the tape engaging face by said intermediate portion, at least one tape engaging tooth provided on said free end portion of each contact clip, means for gripping the tape between assembled components of said body to hold the tape against longitudinal movement in one direction, said components during assembly being effective to provide relative displacement of the contact clip teeth and the tape longitudinally of the tape whereby during an initial stage of said relative displacement said teeth may plough through the tape insulation overlying the ribbon conductors and during a final stage of the displacement the teeth may scrape the ribbon conductors longitudinally under the resilient bias of the intermediate portions of said contact clips, and tape deflecting means provided on one of said components for deflecting the tape out of the plane of said tape engaging face and thereby causing longitudinal displacement of the tape relative to the teeth of said contact clips during assembly of the components.

7. A method of making an electrical connection to insulation-covered ribbon conductors of a cable tape by means of a connector having a body consisting of separably assembled components and resiliently biased toothed contact clips in said body, said method comprising the steps of inserting the tape into the connector body, gripping the tape to prevent its longitudinal movement in one direction, and assembling the body components so as to provide relative displacement of the contact clips and the tape longitudinally of the tape, wherein during an initial stage of the relative displacement the teeth of the clips may plough through the tape insulation and during final stage of the displacement the teeth may scrape the ribbon conductors longitudinally under the resilient bias of the contact clips, assembling the body components including the step of causing deflection of the tape from an initial plane to produce longitudinal displacement of the tape relative to teeth of the contact clips during assembly.

(References on following page)

References Cited

UNITED STATES PATENTS

| | | | |
|---|---|---|---|
| 2,719,957 | 10/1955 | Abbott | 339—99 |
| 3,201,745 | 8/1965 | Williams | 339—99 |
| 3,252,126 | 5/1966 | Brown | 339—99 |
| 3,253,248 | 5/1966 | Brown | 339—99 |
| 3,333,229 | 7/1967 | Dean et al. | 339—99 |

FOREIGN PATENTS 956,917  4/1964  Great Britain.

MARVIN A. CHAMPION, *Primary Examiner.*

J. H. McGLYNN, *Assistant Examiner.*

U.S. Cl. X.R.

339—176, 17